(12) United States Patent
Mengle et al.

(10) Patent No.: US 9,710,456 B1
(45) Date of Patent: Jul. 18, 2017

(54) ANALYZING USER REVIEWS TO DETERMINE ENTITY ATTRIBUTES

(71) Applicant: Google Inc., Mountain View, CA (US)

(72) Inventors: Advay Mengle, Sunnyvale, CA (US); Jindong Chen, Hillsborough, CA (US); Charmaine Cynthia Rose D'Silva, Sunnyvale, CA (US); Anna Patterson, Saratoga, CA (US)

(73) Assignee: GOOGLE INC., Mountain View, CA (US)

( * ) Notice: Subject to any disclaimer, the term of this patent is extended or adjusted under 35 U.S.C. 154(b) by 116 days.

(21) Appl. No.: 14/709,455

(22) Filed: May 11, 2015

Related U.S. Application Data

(60) Provisional application No. 62/076,930, filed on Nov. 7, 2014.

(51) Int. Cl.
*G06F 17/27* (2006.01)

(52) U.S. Cl.
CPC .................... *G06F 17/278* (2013.01)

(58) Field of Classification Search
None
See application file for complete search history.

(56) References Cited

U.S. PATENT DOCUMENTS

| | | | | |
|---|---|---|---|---|
| 2008/0215571 | A1* | 9/2008 | Huang | G06F 17/30719 |
| 2008/0249764 | A1* | 10/2008 | Huang | G06F 17/2785 |
| | | | | 704/9 |
| 2010/0017386 | A1* | 1/2010 | Anderson | G06F 17/3071 |
| | | | | 707/E17.017 |
| 2015/0286643 | A1* | 10/2015 | Kumar | G06F 17/30672 |
| | | | | 707/728 |
| 2016/0210678 | A1* | 7/2016 | Raman | G06Q 30/0625 |
| 2016/0267377 | A1* | 9/2016 | Pan | G06F 17/2785 |

OTHER PUBLICATIONS

Liu, B., Hu, M., & Cheng, J. (May 2005). Opinion Observer: Analyzing and Comparing Opinions on the Web. In Proceedings of the 14th international conference on World Wide Web (pp. 342-351). ACM.

Hu, M., & Liu, B. (Aug. 2004). Mining and summarizing customer reviews. In Proceedings of the tenth ACM SIGKDD international conference on Knowledge discovery and data mining (pp. 168-177). ACM.

(Continued)

*Primary Examiner* — Satwant Singh
(74) *Attorney, Agent, or Firm* — Middleton Reutlinger

(57) ABSTRACT

Methods and apparatus are described herein for classifying user reviews or portions thereof as being related to various entities, and for associating extracted descriptive segments of text contained in those user reviews or portions thereof with entities based on the classifications. In various implementations, one or more portions of a corpus of user reviews may be classified as being related to a first entity or a second entity. One or more descriptive segments of text may be extracted from the one or more classified portions. The one or more extracted descriptive segments of text may be associated with the first or second entity based on classifications of the one or more classified portions.

13 Claims, 6 Drawing Sheets

(56) References Cited

OTHER PUBLICATIONS

Hu, M., & Liu, B. "Mining and Summarizing Customer Reviews." (2004). http://sifaka.cs.uiuc.edu/course/591cxz04f/peng1.pdf, 13 pages.

Pang, Bo, Lillian Lee, and Shivakumar Vaithyanathan. (Jul. 2002). "Thumbs up? Sentiment Classification using Machine Learning Techniques." http://clair.si.umich.edu/~radev/767w10/papers/Week02/Sentiment/sentiment.pdf, 8 pages.

Ghani, Rayid, Katharina Probst, Yan Liu, Marko Krema, and Andrew Fano. "Text Mining for Product Attribute Extraction." ACM SIGKDD Explorations Newsletter 8, No. 1 (2006): 41-48.

Htay, Su Su, and Khin Thidar Lynn. "Extracting Product Features and Opinion Words Using Pattern Knowledge in Customer Reviews." The Scientific World Journal 2013 (2013), Article ID 394758, 5 pages.

Turney, Peter D. "Thumbs Up or Thumbs Down?: Semantic Orientation Applied to Unsupervised Classification of Reviews." In Proceedings of the 40th annual meeting on association for computational linguistics, Association for Computational Linguistics, 2002, pp. 417-424.

Hu, M., & Liu, B. "Mining Opinion Features in Customer Reviews." In AAAI, vol. 4, No. 4, pp. 755-760, 2004.

Zhang, Lei, and Bing Liu. (Jun. 2011) "Identifying Noun Product Features that Imply Opinions." http://www.cs.uic.edu/~liub/publications/ACL-2011-short-noun-opinion.pdf, pp. 575-580.

Popescu, Ana-Maria, and Oren Etzioni (2007). "Extracting Product Features and Opinions from Reviews." http://ai.cs.washington.edu/www/media/papers/tmpQRVYFi.pdf, pp. 9-28.

Somprasertsri, Gamgarn, and Pattarachai Lalitrojwong. "Mining Feature-Opinion in Online Customer Reviews for Opinion Summarization." J. UCS 16, No. 6 (2010): 938-955.

Etzioni, Oren, Michael Cafarella, Doug Downey, Ana-Maria Popescu, Tal Shaked, Stephen Soderland, Daniel S. Weld, and Alexander Yates. "Unsupervised Named-Entity Extraction from the Web: An Experimental Study." (Feb. 28, 2005), 42 pages.

Gupta, Nikhil, Kumar, Praveen, Gupta, Rahul. CS 224N Final Project: Automated Extraction of Product Attributes from Reviews. Jun. 5, 2009. http://nlp.stanford.edu/courses/cs224n/2009/fp/26.pdf, 16 pages.

\* cited by examiner

I have to say that I am becoming more impressed with the user-friendly products being released by the Acme Camera Company! Each product I have purchased from them in the last few years has been a marked improvement over the last. For example, Acme's 2014 XYZ SLR camera has so many great features, ranging from an extremely powerful default telephoto lens to a user menu that is appealing and very easy to navigate. My technophobe friend could learn to use this camera! It even includes a voice recognition interface. However, I would purchase this camera from an actual camera store, rather than Online Camera World, who doesn't offer much in the way of customer service.

Fig. 3

ANALYZING USER REVIEWS TO DETERMINE ENTITY ATTRIBUTES

BACKGROUND

Entities such as products, product creators, and/or product vendors may be discussed by individuals (referred to herein as "users") in online user reviews. For instance, an online user review about a software application may describe the software application, the creator of the software application, and perhaps even a vendor (separate from the software application creator) that sells the software application, such as an online marketplace. These types of user reviews may include information about entities that may not have been provided or generated, for instance, by the entities themselves.

SUMMARY

The present disclosure is generally directed to methods, apparatus and computer-readable media (transitory and non-transitory) for analyzing a corpus of user reviews to associate one or more descriptive segments of text extracted from the user reviews with one or more entities (e.g., products, product creators, product vendors). In various implementations, various techniques may be used to classify individual user reviews and/or portions thereof (e.g., paragraphs, sentences, phrases, etc.) as related to a particular entity. Descriptive segments of text, such as entity names/ aliases, "categories" (explained further herein), nouns, adjectives, and so forth, may be extracted from the classified portions using various natural language processing techniques. Descriptive segments of text may then be associated with entities based on classifications of respective portions of user reviews from which the descriptive segments of text were extracted. In some implementations, an entity may be indexed (in some instances, further indexed or reindexed) in a database based on one or more descriptive segments of text that have been associated with the entity using techniques described herein.

In some implementations, a computer implemented method may be provided that includes the steps of: classifying one or more portions of a corpus of user reviews as being related to a first entity or a second entity; extracting, from the one or more classified portions, one or more descriptive segments of text; and associating the one or more extracted descriptive segments of text with the first or second entity based on classifications of the one or more classified portions.

This method and other implementations of technology disclosed herein may each optionally include one or more of the following features.

In various implementations, the classifying may include: classifying, with a first machine learning classifier, a first set of portions of the one or more user reviews as being related to the first entity; and classifying, with a second machine learning classifier, a second set of portions of the one or more user reviews as being related to the second entity.

In various implementations, the associating may include indexing the first or second entity on the one or more extracted descriptive segments of text. In various implementations, the method may further include extracting, from the one or more classified portions, one or more comparison segments of text comparing a third entity to the first or second entity, and indexing the first or second entity on the one or more comparison segments of text.

In various implementations, the first entity may be a product, the second entity may be a creator of the product, and the method may further include: classifying one or more portions of one or more user reviews as being related to a vendor of the product; extracting, from the one or more portions classified as related to the vendor, one or more descriptive segments of text; and indexing the vendor on the one or more descriptive segments of text extracted from the one or more portions classified as related to the vendor.

In various implementations, the classifying may include detecting, in the one or more user reviews, one or more terms associated with one or more categories of predicted or observed interest. In various implementations, the method may further include determining a strength of association between an extracted descriptive segment of text and the first or second entity based on one or more signals. In various implementations, the one or more signals may include a proximity in a user review between the extracted descriptive segment of text and a link to an interface describing the first or second entity. In various implementations, the one or more signals may include a frequency of the extracted descriptive segment of text across the corpus of user reviews. In various implementations, the one or more signals may include user feedback about a user review from which the descriptive segment of text was extracted.

In various implementations, the method may include identifying a relationship between the creator of the product and one or more other products, and indexing the one or more other products on the one or more extracted descriptive segments of text based on classifications of the one or more portions.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 depicts an example user review, in accordance with various implementations.

DETAILED DESCRIPTION

Figure 1:
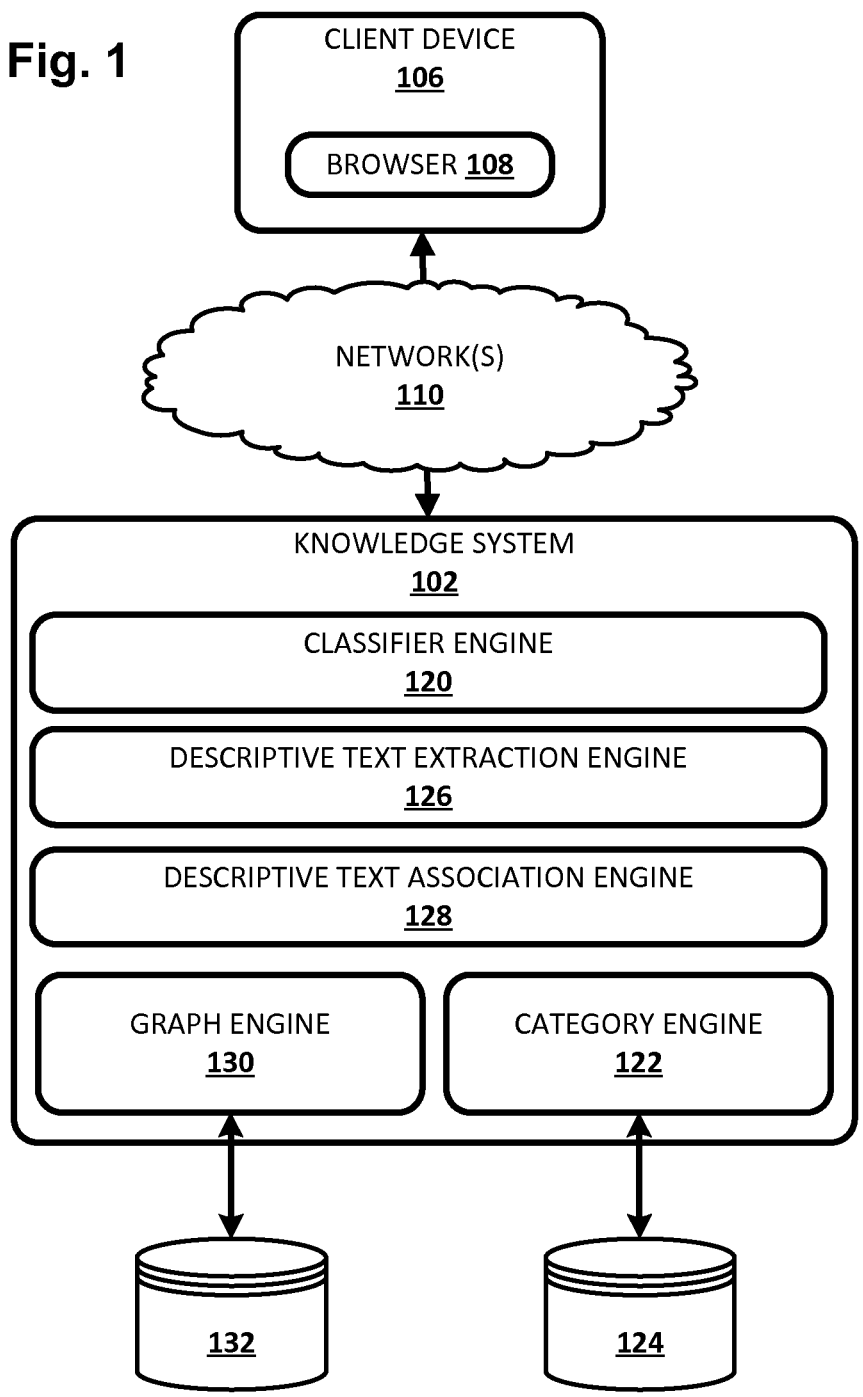
FIG. 1 depicts an example environment in which various components may perform selected aspects of the present disclosure.

FIG. 1 illustrates an example environment in which a corpus of user reviews may be analyzed, and in which one or more descriptive segments of text may be associated with one or more entities based on that analysis. As used herein, a "user review" may refer to text of any length that is authored by one or more users to communicate the one or more users' opinions about one or more entities. In various implementations, user reviews may be gathered from one or more of blog or social network postings, emails, articles written for websites or for printed publications such as magazines or newspapers, postings made to a user review section of an online vendor or marketplace, or even user reviews submitted to various existing user review clearinghouses.

The example environment includes a client device 106 and a knowledge system 102. Knowledge system 102 may be implemented in one or more computers that communicate, for example, through one or more networks 110. Knowledge system 102 is an example of an information retrieval system in which the systems, components, and techniques described herein may be implemented and/or with which systems, components, and techniques described herein may interface.

A user may interact with knowledge system 102 via client device 106 and/or other computing systems (not shown). While the user likely will operate a plurality of computing devices, for the sake of brevity, examples described in this disclosure will focus on the user operating client device 106. Client device 106 may be a computer coupled to the knowledge system 102 through a network 110 such as a local area network (LAN) or wide area network (WAN) such as the Internet. The client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. Client device 106 may execute one or more applications, such as browser 108.

Client device 106 and knowledge system 102 each include memory for storage of data and software applications, one or more processors for accessing data and executing applications, and components that facilitate communication over a network. The operations performed by client device 106 and/or knowledge system 102 may be distributed across multiple computer systems. Knowledge system 102 may be implemented as, for example, computer programs running on one or more computers in one or more locations that are coupled to each other through a network.

In various implementations, knowledge system 102 may include a classifier engine 120, a category engine 122, a descriptive text extraction engine 126, a descriptive text association engine 128, and a graph engine 130. In some implementations, one or more of engines 120, 122, 126, 128, and/or 130 may be omitted. In some implementations all or aspects of one or more of engines 120, 122, 126, 128, and/or 130 may be combined. In some implementations, one or more of engines 120, 122, 126, 128, and/or 130 may be implemented in a component that is separate from the knowledge system 102. In some implementations, one or more of engines 120, 122, 126, 128, and/or 130, or any operative portion thereof, may be implemented in a component that is executed by client device 106.

Classifier engine 120 may be configured to utilize various techniques to classify individual user reviews and/or portions thereof as being related to various entities. Various classification mechanisms may be employed to determine which entity or entity type a user review or portion thereof describes. In some implementations, separate machine learning classifiers may be trained and then deployed to classify segments of text as related to different entities. For example, in some implementations, a first machine learning classifier may be trained and employed to classify user reviews and/or portions thereof as being related to a particular product. In some implementations, a second machine learning classifier may be trained and employed to classify user reviews and/or portions thereof as being related to a creator of the product. In some implementations, a third machine learning classifier may be trained and employed to classify user reviews and/or portions thereof as being related to a particular vendor that happens to sell the particular product.

In some implementations, one or more "categories of interests" in entities may be employed to classify user reviews and/or portions thereof as being related to particular entities. Detection of words or phrases in a user review that correspond to these categories (e.g., as sufficiently similar) may be interpreted as signals for classifying the user review or a portion thereof as related to an entity. Categories of interest may come in various forms, such as categories of predicted interest and categories of observed interest. In various implementations, a category engine 122 may maintain an index 124 of categories that may be used by classifier engine 120 to classify user reviews and/or portions thereof.

In some implementations, categories of predicted interest may be based on so-called "labeled" navigational queries that may be predicted as being logical categories in which users may have interest. For example, users may operate graphical user interface elements (e.g., as selections of a drop down menu) representing categories of predicted interest to browse through products of potential interest. Suppose a particular vendor is an online marketplace of software applications, or "apps," and that those "apps" are typically created by third party entities. A user of client device 106 may browse the online marketplace using applications such as browser 108. The online marketplace interface the user interacts with (which in some instances may be a web page or similar interface) may include links to various categories of predicted interest in applications, such as "role playing games," "golf games," "arcade games," "word processors," "streaming applications," "music applications," and so forth. Various entities may identify categories of predicted interest. For example, entities such as app creators may propose categories of predicted interest in which they believe their apps will fall, e.g., at a user interface associated with category engine 122. Similarly, the entity controlling the online marketplace (i.e., a vendor) may propose its own categorizations of apps creators submit.

Categories of observed interests, by contrast, may be determined, e.g., by category engine 122, based on patterns observed in user activity, such as among a plurality (or corpus) of user queries. For example, and continuing with the online marketplace of apps example, multiple users may search for apps using the same or similar terms or phrases. If sufficient users submit queries containing a particular word or phrase (or similar variations thereof), then category engine 122 may deem those words or phrases to constitute a category of observed interest, and may update index 124 accordingly. Thus, if enough users search an online marketplace for "massively multiplayer online role-playing games," or "MMORPG," a MMORPG category may be established.

Descriptive text extraction engine 126 may be configured to extract, from user reviews or portions thereof that have been classified by classifier engine 120, one or more descriptive and/or comparison segments of text. "Descriptive segments of text" may include one or more words that communicate category names or aliases (predetermined and/or observed interest), entity names or aliases, nouns, and/or adjectives. Various natural language processing techniques may be employed for this extraction, including but not limited to co-reference resolution, grammars, regular expressions, objection completion, textual rewrites (e.g., "Bob has blue eyes; Tom does not"→"Bob has blue eyes" and "Tom does not have blue eyes"), heuristics, machine learning, and so forth. While not depicted in FIG. 1, in some implementations, one or more annotators may be employed to annotate (or even replace portions of) user reviews. In such implementations, these annotations may be used by descriptive text extraction engine 126 to assist in descriptive text extraction.

"Comparison segments of text" may include one or more words that are associated with another entity to which an entity under consideration is compared. Suppose a user review classified as pertaining to Product X includes the following sentence, "Product X is better than Product Y." In some implementations, descriptive text extraction engine 126 may index an entity Product X not only on one or more descriptive segments of text in the review that pertain to Product X, but also may index the entity Product X by Product Y.

Descriptive text association engine 128 may be configured to associate descriptive text extracted by descriptive text extraction engine 126 with one or more entities, e.g., in index 124 maintained by graph engine 130. In various implementations, descriptive text association engine 128 may associate a particular descriptive segment of text with an entity based on a classification of a portion of a user review from which the particular descriptive segment of text was extracted.

In some implementations, descriptive text association engine 128 may determine a score, strength of association and/or other quantitative measure to be assigned to associations between descriptive segments of text and entities. For example, if a particular descriptive segment of text (e.g., category, entity name/alias, noun and/or adjective) is found frequently across a corpus of user reviews, it may be strongly associated with a particular entity or entities. As another example, if the user reviews from which descriptive segments of text are extracted are determined, based on user feedback, to be helpful or unhelpful to users searching for particular types of products, that feedback may be used as a positive or negative signal, e.g., for a machine learning classifier (not depicted) associated with descriptive text association engine 128. As yet another example, the proximity in a user review of a descriptive segment of text to a link to an entity interface (e.g., a product website) may also dictate a strength of association between the entity and the descriptive segment of text.

In some implementations, descriptive text association engine 128 may utilize relationships between entities to associate descriptive segments of text across multiple entities. For example, suppose a particular product creator entity is associated with multiple product entities (i.e., products that creator created). Suppose further that similar descriptive segments of text (e.g., "good gameplay") have been associated with several products by the creator entity. Descriptive text association engine 128 may apply those same descriptive segments of text to other products by the same product creator entity, even where the descriptive segments of text are not found to be explicitly used in association with those other products. In other words, descriptive text association engine 128 may "assume" that, because many products created by a particular entity are associated with a particular descriptive segment of text, it would be fair to associate the same descriptive segments of text with other products created by the same entity.

Graph engine 130 may build and maintain an index 132 of collections of entities and associated attributes. In various implementations, graph engine 130 may represent entities as nodes and relationships between entities as edges. In various implementations, graph engine 130 may represent collections of entities, entity attributes and entity relationships as directed or undirected graphs, hierarchical graphs (e.g., trees), and so forth. As used herein, an "entity" may generally be any person, organization, place, thing. An "organization" may include a company, partnership, nonprofit, government (or particular governmental entity), club, sports team, a product vendor, a product creator, a product distributor, etc. A "thing" may include tangible (and in some cases fungible) products such as a particular model of tool, a particular model of kitchen or other appliance, a particular model of toy, a particular electronic model (e.g., camera, printer, headphones, smart phone, set top box, video game system, etc.), and so forth. A "thing" additionally or alternatively may include an intangible (e.g., downloadable) product such as software (e.g., the apps described above).

In this specification, the term "database" and "index" will be used broadly to refer to any collection of data. The data of the database and/or the index does not need to be structured in any particular way and it can be stored on storage devices in one or more geographic locations. Thus, for example, the indices 124 and/or 132 may include multiple collections of data, each of which may be organized and accessed differently.

Suppose a user review includes the sentence "The XYZ Model camera has great optical zoom capabilities, which is typical for cameras of the Acme Camera Company." Classifier engine 120 may classify the first portion of this sentence ("The XYZ model camera has great optical zoom capabilities") as being related to an entity node in index 132 that represents an "XYZ Model Camera." Although the portion already contains the product model name explicitly, other phrases in the portion that might be interpreted as signals that the phrase is about a camera are the categories, "camera" and "optical zoom." As mentioned previously, "camera" and "optical zoom" may be predicted categories of interest (e.g., represented by graphical elements a user may use to browse cameras) or observed categories of interest (e.g., a sufficient number of users have searched for "cameras with optical zoom"). Classifier engine 120 may classify the second portion of this sentence ("which is typical for cameras of the Acme Camera Company") with another entity node in index 132 that represents the "Acme Camera Company."

Descriptive text extraction engine 126 may utilize various natural language processing techniques to extract descriptive segments of text from the classified portions. For example, descriptive text extraction engine 126 may extract "XYZ Model," "camera," "great," "optical zoom," and/or "capabilities" from the first portion. Descriptive text extraction engine 126 may rewrite the second portion to read "Cameras of the Acme Camera Company typically have great optical zoom" or some variation thereof. Descriptive text extraction engine 126 may then extract "cameras," "Acme Camera Company," "typically," "great," and/or "optical zoom."

Descriptive text association engine 128 may associate the descriptive segments of text extracted by descriptive text extraction engine 126 with one or more entities maintained by graph engine 130. For example, descriptive text association engine 128 may associate "camera," "great" (alone or as a modifier to "optical zoom"), and/or "optical zoom capabilities" with the entity node in index 132 that represents an "XYZ Model Camera." Similarly, descriptive text association engine 128 may associate "cameras," and/or some combination of "typically," "great," and "optical zoom" with the entity node in index 132 that represents "Acme Camera Company."

Graph engine 130 may perform various actions with these newly associated entity attributes and/or scores. For example, in some implementations, graph engine 130 may interface with a search engine (not depicted), and may index one or more entities based on one or more descriptive segments of text that are associated with those one or more entities, e.g., by descriptive text association engine 128.

Figure 2:
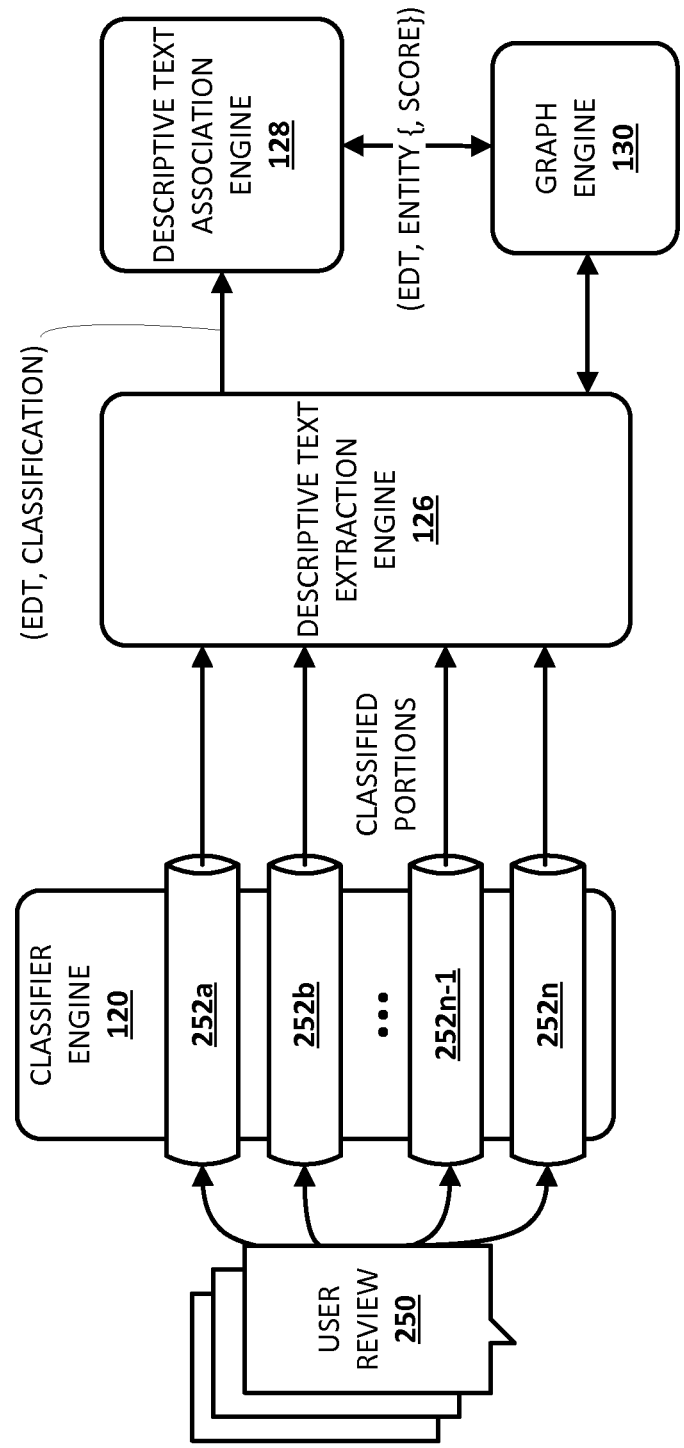
FIG. 2 illustrates an example of how a corpus of user reviews may be analyzed by various components of the present disclosure to associate one or more descriptive segments of text with one or more entities.

FIG. 2 depicts an example of how user reviews 250 may be analyzed, in accordance with various implementations. In this non-limiting example, classifier engine 120 includes a plurality of machine learning classifiers 252*a-n*, or simply "classifiers," each which may be trained to selectively classify a user review and/or portion thereof as being related to a particular entity. For example, a first machine learning classifier 252*a* may be trained to selectively classify user reviews or portions thereof as related to (or not related to) a first product. A second machine learning classifier 252*b* may be trained to selectively classify user reviews or portions thereof as related to a creator of the first product. A third machine learning classifier 252*c* (not depicted) may be trained to selectively classify user reviews or portions thereof as related to a product vendor that sells the first product. A fourth machine learning classifier 252*n*−1 may be trained to selectively classify user reviews or portions thereof as related to a second product. A fifth machine learning classifier 252*n* may be trained to selectively classify user reviews or portions thereof as related to a creator of the second product. And so on. The output of each classifier may, in some implementations, be those user reviews and/or portions thereof that were successfully classified.

Descriptive text extraction engine 126 may perform natural language processing and output pairs of extracted descriptive segments of text ("EDT" in FIG. 2) and associated classifications to descriptive text association engine 128. Descriptive text association engine 128 may consult with graph engine 130 (as indicated by the arrow between them) to determine, e.g., based on a classification of a user review or portion thereof, which entity a particular descriptive segment of text should be associated with. In various implementations, descriptive text association engine 128 may output tuples of extracted descriptive segments of text and entities to which those extracted descriptive segments of text should be associated. In some implementations, those same tuples may optionally include a score, strength of association or other quantitative measure that may be used to characterize the association between a descriptive segment of text and an entity.

In various implementations, various forms of feedback may be provided to various components to adjust how, for instance, portions of user reviews are classified, which descriptive segments of text are extracted, whether particular words or phrases are considered "categories," and/or whether how strongly descriptive segments of text should be associated with entities. Suppose a particular machine learning classifier 252*a* is trained to classify user reviews or portions thereof as being related to a particular product. However, suppose search engine results returned based on descriptive segments of text used to index the product based on the classification prove to be unpopular. That unpopularity may be interpreted, e.g., by machine learning classifier 252*a*, as negative feedback, and it may adjust its analysis techniques accordingly.

FIG. 3 depicts an example user review that includes various portions that may be classified, and various descriptive segments of text that may be associated with entities based on those classifications. Just a few examples of classification/association will be described herein. Other portions of the user review and descriptive segments of text contained therein may be classified and/or associated with entities.

In FIG. 3, there are three hyperlinks: a first to the "Acme Camera Company" website; a second to a website for Acme's product, the "2014 XYZ SLR camera"; and a third to a vendor website "Online Camera World." The sentences in which each of these hyperlinks are contained may be classified, e.g., by classifier engine 120, as being related to those respective entities, e.g., based on the presence of those entity names/aliases and other noun/adjectives in the sentence.

Descriptive text extraction engine 126 may extract various descriptive segments of text from those sentences, e.g., using various natural language processing techniques. For example, descriptive text extraction engine 126 may rewrite the last phrase "who doesn't offer much in the way of customer service" as, for instance, "Online Camera World does not offer adequate customer service." Descriptive text extraction engine 126 may then extract various descriptive segments of text from the rewritten text, such as "Online Camera World," "adequate," and/or "customer service."

Descriptive text association engine 128 may associate the extracted descriptive segments of text with various entities, and/or may assign various scores to those associations. Suppose the sentence "For example, Acme's 2014 XYZ SLR camera has so many great features, ranging from an extremely powerful default telephoto lens to a user menu that is appealing and very easy to navigate" yields descriptive segments of text "great features," "powerful," "default telephoto lens," "user menu," "appealing," and/or "easy to navigate." Descriptive text association engine 128 may associate one or more of these descriptive segments of text with an entity node representing the product 2004 XYZ SLR camera. Based on the proximity of these segments of text to the link to the product website (e.g., in the same sentence), descriptive text association engine 128 may assign relatively high scores (e.g., strengths of association) to the associations between these segments of text and the corresponding entities. By contrast, another segment of text classified as being related to the product, "It even includes a voice recognition interface," may be assigned a slightly lower score because it is farther from the link to the camera's website.

Figure 4:
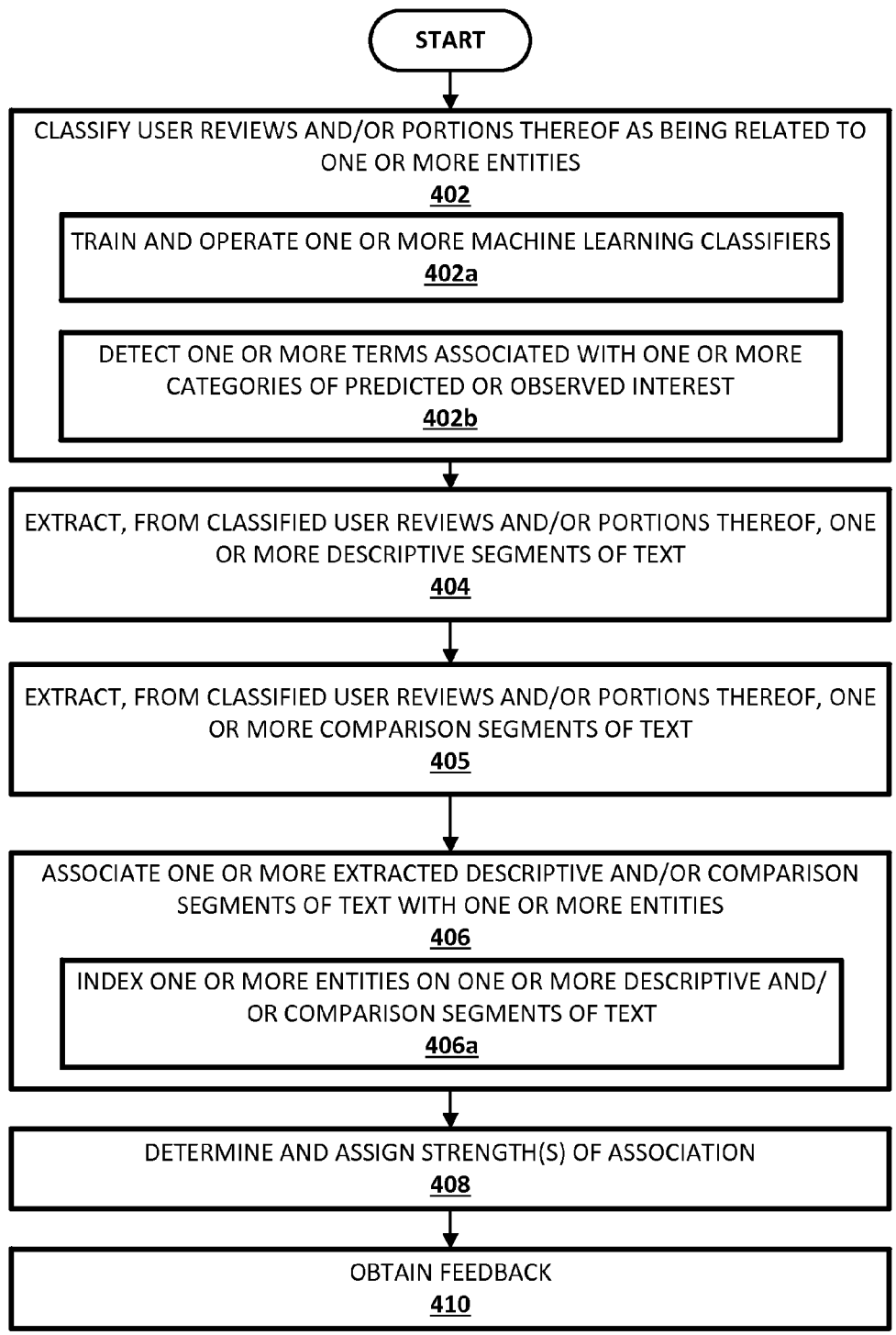
FIG. 4 depicts a flow chart illustrating an example method of classifying user reviews and/or portions thereof, and associating extracted descriptive segments of text with various entities based on the classifications, in accordance with various implementations.

Referring now to FIG. 4, an example method 400 of classifying user reviews and/or portions thereof and associating descriptive segments of text with entities is described.

For convenience, the operations of the flow chart are described with reference to a system that performs the operations. This system may include various components of various computer systems. Moreover, while operations of method 400 are shown in a particular order, this is not meant to be limiting. One or more operations may be reordered, omitted or added.

At block 402, the system may classify user reviews and/or portions thereof as being related to one or more entities. For example, at block 402a, the system may train and/or operate one or more machine learning classifiers to classify user reviews and/or portions thereof as being related to particular entities. In some implementations, a single classifier may be trained to classify user reviews and/or portions thereof as being related (or not related) to a single entity. In other implementations, a single classifier may be trained to classify user reviews and/or portions thereof as being related to one or more of a plurality of potential entities. As another example, at block 402b, the system may detect, in one or more user reviews and/or portions thereof, one or more terms associated with one or more categories of predicted and/or observed user interest, and may classify user reviews and/or portions thereof based at least in part on the detection.

At block 404, the system may extract, from classified user reviews and/or portions thereof, one or more descriptive segments of text. As noted above, the system may employ various natural language processing to locate and extract descriptive segments of text, such as co-reference resolution, textual rewrites, and so forth. Also as noted above, descriptive segments of text may include one or more words that constitute a noun, adjective, a category name/alias, an entity name/alias, and any other segment of text that may be pertinent to an entity.

At optional block 405, the system may extract, from classified user reviews and/or portions thereof, one or more comparison segments of text that compare an entity to which a user review and/or portion thereof is classified to another entity. As was the case with descriptive segments of text, the system may employ various natural language processing to locate and extract comparison segments of text, such as co-reference resolution, textual rewrites, and so forth. Also, comparison segments of text may include one or more words that constitute a noun, adjective, a category name/alias, an entity name/alias, and any other segment of text that may be pertinent to an entity to which another entity is comparable.

At block 406, the system may associate one or more descriptive and/or comparison segments of text extracted at blocks 404-405 with one or more entities based on the classification performed at block 402. For example, at block 406a, the system may index one or more entities on one or more descriptive and/or comparison segments of text extracted at block 404. Additionally or alternatively, the system may add an "attribute" to an entity node in, for instance, index 132, so that the entity may be associated, e.g., by a search engine, with that attribute moving forward. At block 408, the system may determine and/or assign one or more strengths to the associations determined at block 406, e.g., based on proximity to links to entity interfaces (e.g., product webpages).

At block 410, the system may obtain feedback from various sources. For instance, suppose the system initially associates descriptive segments of text that are mostly positive with a particular product. This may cause the product to be indexed on these descriptive terms with an initial strength of association. This may also increase how often the product is presented to a broader range of users (e.g., users of search engines). However, as the product is presented more often to more users, these additional users may begin rating the product as negative. This negative feedback may cause the system to reduce the strength of association between the product and the descriptive segments of text used for reindexing, and in some instances, could even lead to dissolution of the association between the product and the descriptive segments of text (e.g., if the strength of association fails to satisfy a threshold). Suppose initial user reviews for a sophisticated camera are largely positive, but are provided by a small base of camera-savvy users. As the sophisticated camera is reindexed using descriptive segments of text (using techniques described herein), a larger base of users may be exposed to the sophisticated camera, but those user may be less savvy, and may find the sophisticated camera difficult to use. They may post negative reviews, which may cause further reindexing and even weakening of strengths of association between the sophisticated camera and the descriptive segments of text.

Figure 5:
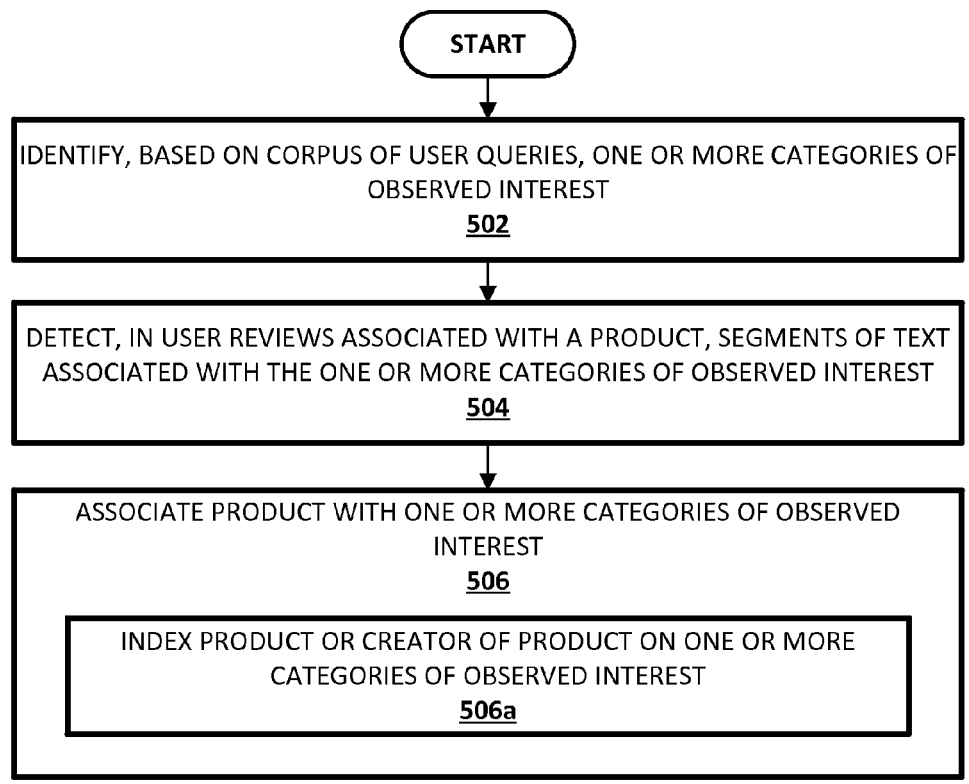
FIG. 5 depicts a flow chart illustrating an example method of determining categories of observed interest and associating entities with those categories, in accordance with various implementations.

Referring now to FIG. 5, an example method 500 of determining categories of observed user interest and associating products (or more generally, entities) with these categories is described. For convenience, the operations of the flow chart are described with reference to a system that performs the operations. This system may include various components of various computer systems. Moreover, while operations of method 500 are shown in a particular order, this is not meant to be limiting. One or more operations may be reordered, omitted or added. In some implementations, one or more operations of methods 400 and 500 may be combined.

At block 502, the system may identify, e.g., based on a corpus of user search engine queries, one or more categories of observed interest. For example, an online marketplace of apps may receive numerous queries from users that include terms or phrases that are part of the popular vernacular of, for instance, "gamers." These terms or phrases (e.g., "MMORPG"), if observed frequently enough (e.g., to satisfy a threshold), may evolve into "official" categories of observed interest. At block 504, the system may detect, in user reviews associated with a particular product, segments of text that are associated with the one or more categories of observed interest identified at block 502. At block 506, the system may associate the product associated with the user reviews with one or more categories of observed user interest identified at block 502. For example, at optional block 506a, the system may index the product, or even a creator of the product, on one or more of the categories of observed interest.

Figure 6:
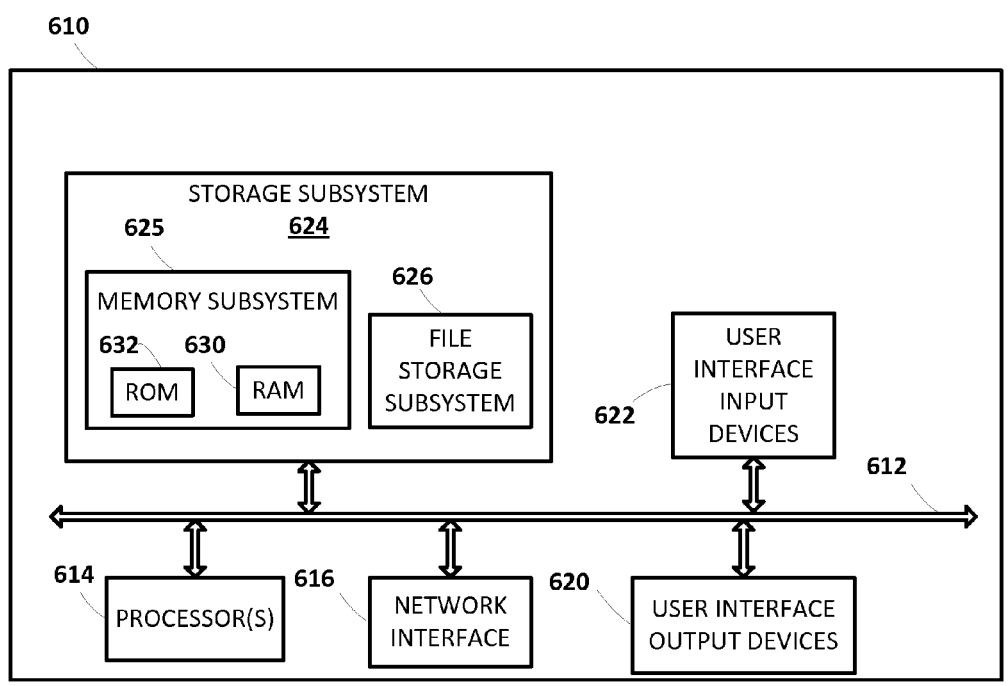
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of methods 400, 500 and/or to implement one or more of classifier engine 120, category engine 122, descriptive text extraction engine 126, descriptive text association engine 128, and/or graph engine 130.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
    classifying one or more portions of a corpus of user reviews as being related to a product or a creator of the product;
    extracting, from the one or more classified portions, one or more descriptive segments of text;
    classifying one or more portions of the corpus of user reviews as being related to a vendor of the product;
    extracting, from the one or more portions classified as related to the vendor, one or more additional descriptive segments of text; and
    indexing, in a searchable database, the product or the creator of the product, and the vendor, wherein the product or the creator of the product is indexed on the one or more descriptive segments of text extracted from the one or more portions classified as related to the product or the creator of the product, and the vendor is indexed on the one or more additional descriptive segments of text extracted from the one or more portions classified as related to the vendor;
    wherein the searchable database is accessible to one or more remote client devices, and is searchable by the product or the creator of the product, and the vendor, to provide search results to be rendered by the one or more remote client devices.

2. The computer-implemented method of claim 1, wherein the classifying comprises:
    classifying, with a first machine learning classifier, a first set of portions of the corpus of user reviews as being related to the product; and
    classifying, with a second machine learning classifier, a second set of portions of the corpus of user reviews as being related to the creator of the product.

3. The computer-implemented method of claim 1, further comprising:
  extracting, from the one or more classified portions, one or more comparison segments of text comparing the vendor to the product or creator of the product; and
  indexing the product or creator of the product on the one or more comparison segments of text.

4. The computer-implemented method of claim 1, wherein the classifying comprises detecting, in the corpus of user reviews, one or more terms associated with one or more categories of predicted or observed interest.

5. The computer-implemented method of claim 1, further comprising determining a strength of association between an extracted descriptive segment of text and the product or the creator of the product based on one or more signals.

6. The computer-implemented method of claim 5, wherein the one or more signals include a proximity in a user review between the extracted descriptive segment of text and a link to an interface describing the product or creator of the product.

7. The computer-implemented method of claim 5, wherein the one or more signals include a frequency of the extracted descriptive segment of text across the corpus of user reviews or user feedback about a user review from which the descriptive segment of text was extracted.

8. A method comprising:
  classifying one or more portions of one or more user reviews as being related to a product or related to a creator of the product using a product machine learning classifier and a product creator machine learning classifier;
  extracting, from the one or more classified portions, one or more descriptive segments of text;
  indexing the product or the creator of the product on the one or more extracted descriptive segments of text in a searchable database based on classifications of the one or more portions; and
  determining a strength of association between an extracted descriptive segment of text and the product or the creator of the product based on one or more signals, wherein the one or more signals include a frequency of the extracted descriptive segment of text across the one or more user reviews or user feedback about a user review from which the descriptive segment of text was extracted;
  wherein the searchable database is accessible to one or more remote client devices, and is searchable by the product or the creator of the product to provide search results to be rendered by the one or more remote client devices.

9. The method of claim 8, further comprising:
  classifying one or more portions of one or more user reviews as being related to a vendor of the product;
  extracting, from the one or more portions classified as related to the vendor, one or more descriptive segments of text;
  indexing the vendor in the searchable database on the one or more descriptive segments of text extracted from the one or more portions classified as related to the vendor.

10. The method of claim 8, wherein the classifying comprises detecting, in the one or more user reviews, one or more terms associated with one or more categories of predicted or observed interest.

11. The method of claim 8, wherein the one or more signals include a proximity in a user review between the extracted descriptive segment of text and a link to an interface describing the product or product creator.

12. The method of claim 8, further comprising:
  identifying a relationship between the creator of the product and one or more other products; and
  indexing the one or more other products on the one or more extracted descriptive segments of text based on classifications of the one or more portions.

13. A method comprising:
  classifying one or more portions of one or more user reviews as being related to a product or related to a creator of the product;
  extracting, from the one or more classified portions, one or more descriptive segments of text;
  indexing the product or the creator of the product in a searchable database on the one or more extracted descriptive segments of text based on classifications of the one or more portions; and
  determining a strength of association between an extracted descriptive segment of text and the product or product creator based on one or more signals, wherein the one or more signals include a proximity in a user review between the extracted descriptive segment of text and a link to an interface describing the product or product creator;
  wherein the searchable database is accessible to one or more remote client devices, and is searchable by the product or the creator of the product to provide search results to be rendered by the one or more remote client devices.

\* \* \* \* \*